(12) United States Patent
Lee et al.

(10) Patent No.: US 11,891,467 B2
(45) Date of Patent: Feb. 6, 2024

(54) OPTICAL CLEAR RESIN AND DISPLAY DEVICE INCLUDING THE SAME

(71) Applicant: SAMSUNG DISPLAY CO., LTD., Yongin-si (KR)

(72) Inventors: Jeongin Lee, Hwaseong-si (KR); Boo-Kan Ki, Yongin-si (KR); Ho Yun Byun, Hwaseong-si (KR); Donghyeon Lee, Seoul (KR); Sebeen Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/815,492

(22) Filed: Jul. 27, 2022

(65) Prior Publication Data
US 2023/0192927 A1 Jun. 22, 2023

(30) Foreign Application Priority Data
Dec. 16, 2021 (KR) .......................... 10-2021-0180420

(51) Int. Cl.
*C08F 220/28* (2006.01)

(52) U.S. Cl.
CPC ...... *C08F 220/281* (2020.02); *C08F 2800/20* (2013.01)

(58) Field of Classification Search
CPC .................................................. C08F 220/281
See application file for complete search history.

(56) References Cited

FOREIGN PATENT DOCUMENTS

| EP | 1341857 B1 * | 8/2005 | ........... C03C 25/106 |
|----|--------------|--------|------------------------|
| KR | 10-0838973 | 6/2008 | |
| KR | 10-2008-0062674 | 7/2008 | |
| KR | 10-2017-0097850 | 8/2017 | |
| KR | 10-1914815 | 11/2018 | |
| KR | 10-2019-0119793 | 10/2019 | |
| KR | 10-2117068 | 5/2020 | |

* cited by examiner

*Primary Examiner* — Catherine S Branch
(74) *Attorney, Agent, or Firm* — F. CHAU & ASSOCIATES, LLC (57) ABSTRACT

An optical clear resin includes a tetrahydrofuran (THF)-based oligomer having a glass transition temperature of about −50° C. or less, an acrylate-based monomer, and a photoinitiator. As the optical clear resin includes the tetrahydrofuran-based oligomer, the curing time of the optical clear resin is shortened and the modulus of elasticity of the optical clear resin is lowered.

20 Claims, 6 Drawing Sheets

| COMPONENTS | COMPARATIVE EXAMPLE | EMBODIMENT |
|---|---|---|
| 4-HBA | 24.6 | 6.78 |
| 2-EHA | 63.9 | 53.05 |
| 1,9-nonanediol diacrylate | 0.2 | - |
| THF-A | - | 14.35 |
| EHDG-AT | - | 11.79 |
| PTHF (MN=13,000, Tg=-74℃) | - | 9.69 |
| PPG1 (MN=10,000, Tg=-44℃) | 2.5 | - |
| PPG2 (MN=27,000, Tg=-59℃) | - | 4.36 |
| PPG3 (MN=38,000, Tg=-6℃) | 7.4 | - |

(UNIT: wt%)

FIG. 5

| | | COMPARATIVE EXAMPLE | EMBODIMENT |
|---|---|---|---|
| CURING CONDITION | Pre-UVA (365nm) | 100 mW/cm² 200 mJ/cm² | 1000 mW/cm² 1200 mJ/cm² |
| | Post-UVV (395nm) | 580 mW/cm² 2000 mJ/cm² | 580 mW/cm² 6000 mJ/cm² |
| MODULUS | at -20℃ | 0.198 MPa | 0.099 MPa |
| | at 25℃ | 0.046 MPa | 0.034 MPa |
| | at 60℃ | 0.023 MPa | 0.025 MPa |
| GLASS TRANSITION TEMPERATURE (Tg) | | -35.1℃ | -40.1℃ |

FIG. 6

OPTICAL CLEAR RESIN AND DISPLAY DEVICE INCLUDING THE SAME

This application claims priority under 35 U.S.C. § 119 to Korean Patent Application No. 10-2021-0180420, filed on Dec. 16, 2021, the content of which in its entirety is herein incorporated by reference.

TECHNICAL FIELD

The present disclosure relates to an optical clear resin and, more specifically, to an optically clear resin used in a display device and a display device including the optical clear resin.

DISCUSSION OF THE RELATED ART

A display device generally includes a display panel for displaying an image and a window affixed to the display panel for protecting the display panel. Pixels are arranged in the display panel, and the image is displayed using the pixels. The image is recognized by the user through the window. An adhesive layer is disposed between the display panel and the window. For example, the adhesive layer may include an optical clear resin. The optical clear resin may be a polymer resin having an adhesive force. The optical clear resin is applied between the display panel and the window while it is in a liquid phase through an inkjet process and then cured through a curing process.

SUMMARY

An optical clear resin includes a tetrahydrofuran(THF)-based oligomer having a glass transition temperature of about −50° C. or less, an acrylate-based monomer, and a photoinitiator.

The glass transition temperature of the tetrahydrofuran-based oligomer may be about −70° C. or less.

A molecular weight of the tetrahydrofuran-based oligomer may be about 20,000 or less.

The molecular weight of the tetrahydrofuran-based oligomer may be about 13,000 or less.

A weight ratio of the tetrahydrofuran-based oligomer, with respect to the optical clear resin, may be about 5 wt % to about 20 wt %.

The acrylate-based monomer may include 4-hydroxybutyl acrylate (4-HBA), 2-ethylhexyl acrylate (2-EHA), tetrahydrofurfuryl acrylate (THF-A), and/or 2-ethylhexyl diethylene glycol acrylate (EHDG-AT).

A weight ratio of the acrylate-based monomer, with respect to the optical clear resin, may be about 70 wt % to about 90 wt %.

A weight ratio of the 4-hydroxybutyl acrylate (4-HBA), with respect to the optical clear resin, may be about 5 wt % to about 15 wt %, a weight ratio of the 2-ethylhexyl acrylate (2-EHA), with respect to the optical clear resin, may be about 50 wt % to about 65 wt %, a weight ratio of the tetrahydrofurfuryl acrylate (THF-A), with respect to the optical clear resin, may be about 10 wt % to about 20 wt %, and a weight ratio of the 2-ethylhexyl diethylene glycol acrylate (EHDG-AT), with respect to the optical clear resin, may be about 5 wt % to about 15 wt %.

The photoinitiator may include ethyl-(2,4,6-trimethylbenzoyl)-phenyl-phosphinate (TPO-L) and/or bis-(2,4,6-trimethylbenzoyl)-phenyl-phosphine oxide (Irgacure 819).

In an embodiment, the optical clear resin may further include a polypropylene glycol (PPG)-based oligomer.

A display device includes a display panel including a folding area, a window disposed over the display panel, an adhesive layer disposed between the display panel and the window, the adhesive layer including an optical clear resin. The optical clear resin includes a tetrahydrofuran(THF)-based oligomer having a glass transition temperature of about −50° C. or less, an acrylate-based monomer, and a photoinitiator.

A modulus of elasticity of the adhesive layer may be about 0.13 MPa or less at −20° C.

A glass transition temperature of the adhesive layer may be about −35° C. or less.

A glass transition temperature of the tetrahydrofuran-based oligomer may be about −70° C. or less.

A molecular weight of the tetrahydrofuran-based oligomer may be about 20,000 or less.

The molecular weight of the tetrahydrofuran-based oligomer may be about 13,000 or less.

A weight ratio of the tetrahydrofuran-based oligomer, with respect to the optical clear resin, may be about 5 wt % to about 20 wt %.

The display device may further include a polarizing layer disposed on the display panel, between the display panel and the window, and the adhesive layer may adhere the polarizing layer to the window.

The display device may further include a protective film disposed under the display panel, a buffer member disposed under the protective film, and a support member disposed under the buffer member.

The display panel may be foldable within the folding area and the adhesive layer and the window may each be foldable in a region corresponding with the folding area of the display panel.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

In describing embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Figure 1:
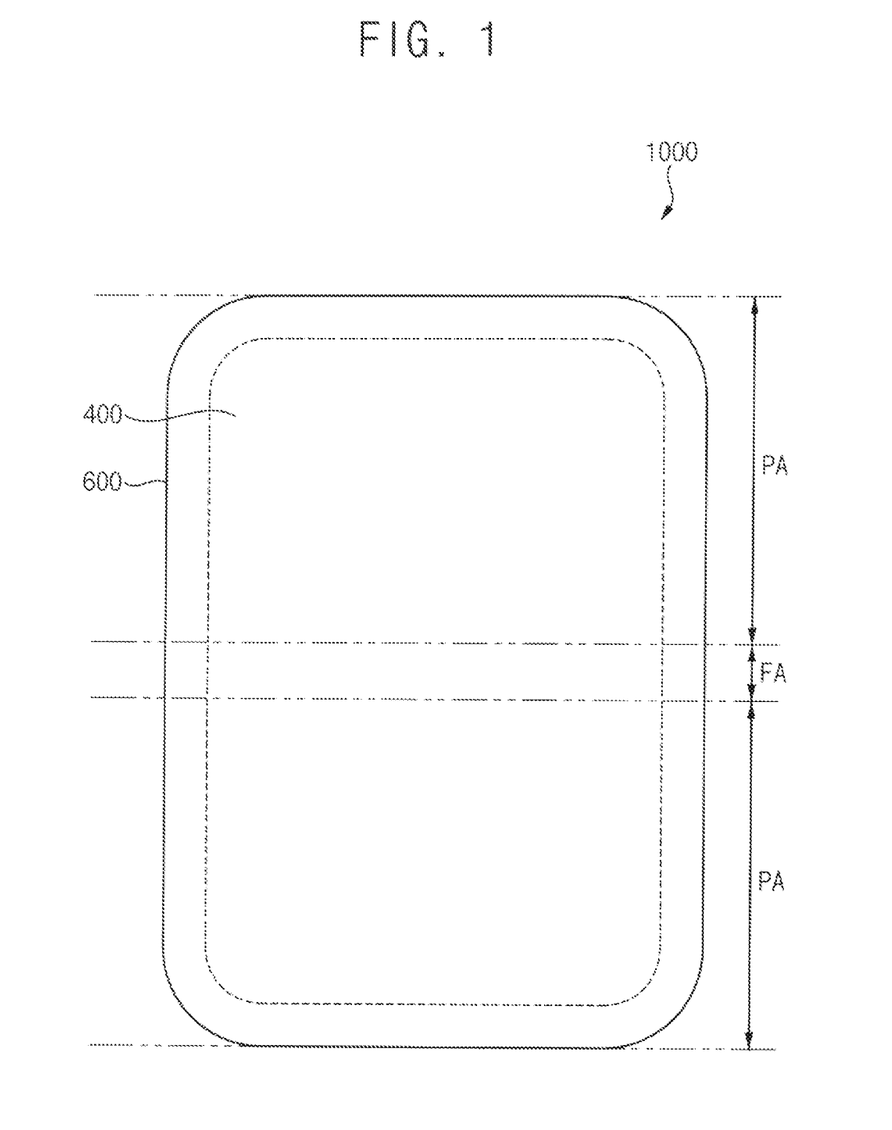
FIG. 1 is a plan view illustrating a display device according to an embodiment of the present invention.
Figure 2:
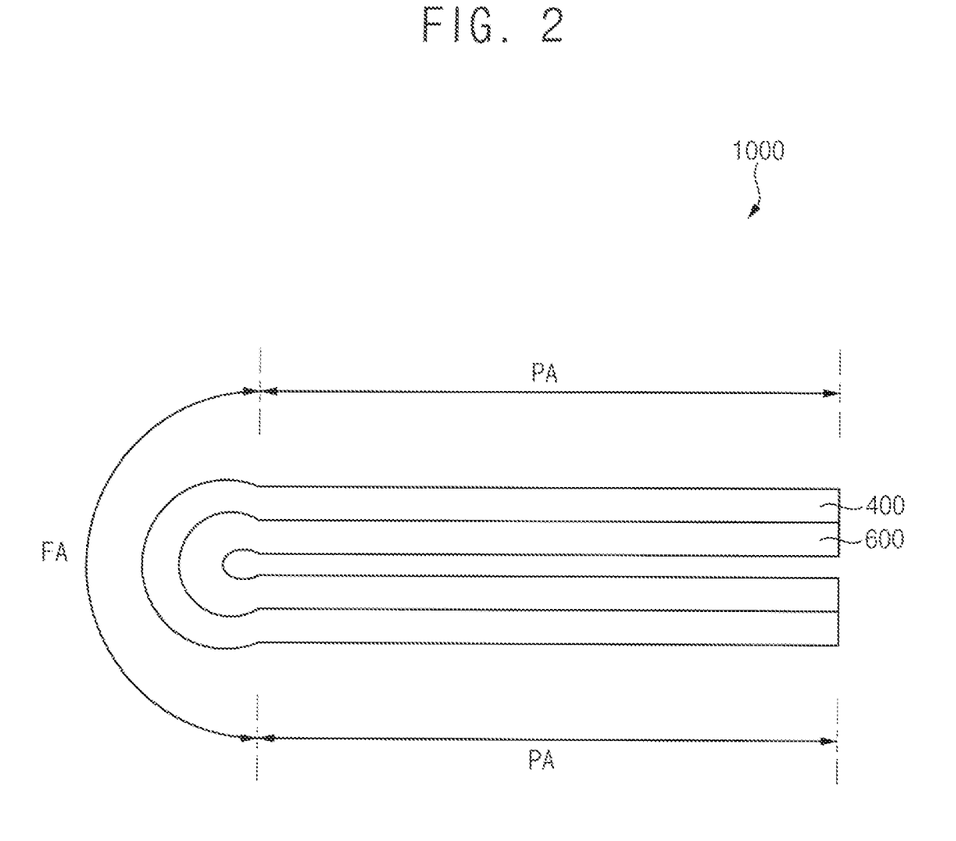
FIG. 2 is a side view illustrating the display device of FIG. 1 in a folded state.

FIG. 1 is a plan view illustrating a display device according to an embodiment of the present invention. FIG. 2 is a side view illustrating the display device of FIG. 1 in a folded state.

Referring to FIGS. 1 and 2, a display device 1000, according to an embodiment of the present invention, may include a display panel 400, an adhesive layer (e.g., an adhesive layer 500 of FIG. 3), and a window 600.

The display panel 400 may include a plurality of pixels and each of the pixels may emit light. The display panel 400 may display an image using the pixels.

The window 600 may be disposed on the display panel 400. The image may be recognized by the user through the window 600.

In an embodiment, the display device 1000 may be divided into at least one folding area FA, within which the display device 1000 may be folded, and at least one flat area PA, in which the display device is not folded. In an embodiment, as shown in FIG. 1, the display device 1000 may include a folding area FA and a flat area PA adjacent to the folding area FA. The display device 1000 may be folded and unfolded in the folding area FA. In addition, the display panel 400 may overlap the folding area FA and the flat area PA, and accordingly, an image may be displayed in both the folding area FA and the flat area PA.

For example, as shown in FIG. 2, the display device 1000 may be folded in the folding area FA. In an embodiment, the display device 1000 may have an in-folding structure. For example, the display device 1000 may be folded so that opposite ends of the display face of the windows 600 face each other such that the display face, through which the image is displayed, is fully protected in the folded state. In another embodiment, the display device 1000 may have an out-folding structure. For example, the display device 1000 may be folded so that opposite ends of the display face of the window 600 face away from each other, so that the image may still be viewed when in the folded state.

However, the display device 1000 is not necessarily limited to the above description. For example, the display device 1000 may include a plurality of folding areas. In this case, the display device 1000 may be in-folded in some folding areas and may be out-folded in other folding areas. In addition, the display device 1000 may have an asymmetric structure in which the areas of the various flat areas are different from each other.

Figure 3:
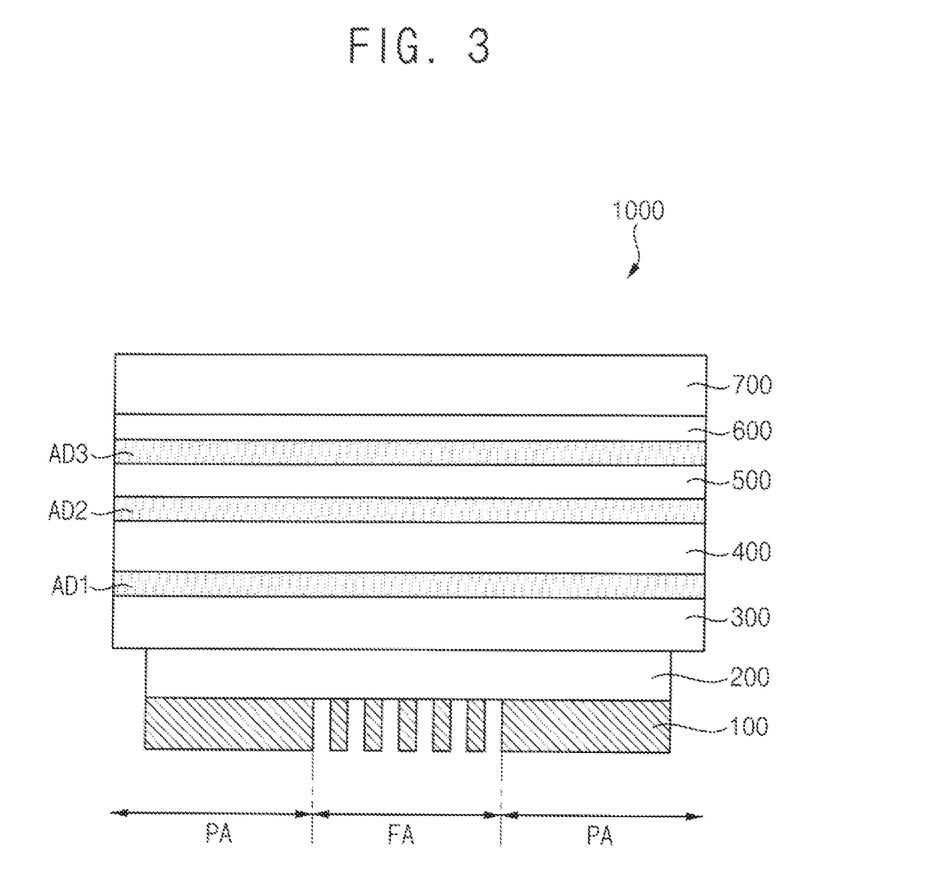
FIG. 3 is a cross-sectional view illustrating the display device of FIG. 1.

FIG. 3 is a cross-sectional view illustrating the display device of FIG. 1.

Referring to FIG. 3, the display device 1000 may include the display panel 400, a first adhesive layer AD1, a protective film 300, a buffer member (or buffer layer) 200, a support member (or support structure) 100, a second adhesive layer AD2, a polarizing layer 500, a third adhesive layer AD3, the window 600, and a protective layer 700.

The first adhesive layer AD1 may be disposed under the display panel 400. The first adhesive layer AD1 may include an optical clear adhesive, an optical clear resin, and/or a pressure sensitive adhesive. The first adhesive layer AD1 may have an adhesive force.

The protective film 300 may be disposed under the first adhesive layer AD1. The protective film 300 may be attached to the display panel 400 through the first adhesive layer AD1. The protective film 300 may be configured to absorb an external shock applied to the display panel 400.

In an embodiment, the protective film 300 may be formed of plastic. Examples of plastics that can be used for the protective film 300 may include polyimide, polyethersulfone, polyacrylate, polyetherimide, polyethylenenaphthalate, polyphenylene sulfide, polyarylate, polycarbonate, poly(arylene ethersulfone), polyethylene terephthalate, and the like. These may be used alone or in combination with each other.

The buffer member 200 may be disposed under the protective film 300. The buffer member 200 may be configured to cushion/absorb an external shock. In an embodiment, the buffer member 200 may be formed of a material capable of buffering air, such as a cushion or a sponge. In addition, the buffer member 200 may include an acrylic resin, polyurethane, thermoplastic polyurethane, latex, polyurethane foam, polystyrene foam, and the like.

The support member 100 may be disposed under the buffer member 200. The support member 100 may be configured to support the display panel 400. In an embodiment, the support member 100 may be formed of a metal material, a non-metal material, or the like. Examples of the metal material that can be used as the support member 100 may include invar, which is an alloy of nickel ("Ni") and iron ("Fe"), stainless steel ("SUS"), titanium ("Ti"), copper ("Cu"), aluminum ("Al") and the like. An example of the non-metal material that can be used as the support member 100 may include fiber reinforced plastic ("FRP"). These may be used alone or in combination with each other. In addition, holes overlapping the folding area FA may be formed in the support member 100. The support member 100 may be substantially rigid and resistant to bending.

The second adhesive layer AD2 may be disposed on the display panel 400. The second adhesive layer AD2 may include an optical clear adhesive, an optical clear resin, and/or a pressure sensitive adhesive. The second adhesive layer AD2 may have an adhesive force.

The polarizing layer 500 may be disposed on the second adhesive layer AD2. The polarizing layer 500 may be adhered to the display panel 400 through the second adhesive layer AD2. As the polarizing layer 500 polarizes external light incident on the display panel 400, a color accuracy of the display panel 400 may be increased.

The third adhesive layer AD3 may be disposed on the polarizing layer 500. The third adhesive layer AD3 may include an optical clear adhesive, an optical clear resin, and/or a pressure sensitive adhesive.

In an embodiment, the third adhesive layer AD3 may be an optical clear resin. The optical clear resin may be liquid. Accordingly, the third adhesive layer AD3 may fill a step difference between the polarizing layer 500 and/or the window 600.

In an embodiment, the optical clear resin included in the third adhesive layer AD3 may include an oligomer, a monomer, and a photoinitiator.

In an embodiment, the optical clear resin may include a tetrahydrofuran (THF)-based oligomer having a glass transition temperature of about −50° C. or less. For example, the optical clear resin may include a polytetrahydrofuran (PTHF)-based oligomer.

As used herein, the term "about" may be understood to mean within a range of plus or minus 10% of the value stated, or within a range of plus or minus 5% of the value stated, or within a range of plus or minus 2% of the value stated, or within a range of plus or minus 1% of the value stated.

In an embodiment, the glass transition temperature ("Tg") of the tetrahydrofuran (THF)-based oligomer may be about −70° C. or less. As the glass transition temperature of the tetrahydrofuran (THF)-based oligomer is set to be relatively low, the glass transition temperature of the third adhesive layer AD3 may also be set to be low. For example, the glass transition temperature of the third adhesive layer AD3 may be about −35° C. or less.

In an embodiment, a molecular weight of the tetrahydrofuran (THF)-based oligomer may be about 20,000 or less. Preferably, the molecular weight of the tetrahydrofuran (THF)-based oligomer may be about 13,000 or less. It is noted that herein, molecular weight is expressed without units.

In an embodiment, the optical clear resin may include an acrylate-based monomer. For example, the acrylate-based monomer may include 4-hydroxybutyl acrylate (4-HBA), 2-ethylhexyl acrylate (2-EHA), tetrahydrofurfuryl acrylate (THF-A), 2-ethyl hexyl diethylene glycol acrylate (EHDG-AT), and the like. These may be used alone or in combination with each other.

In an embodiment, the photoinitiator included in the optical clear resin may include ethyl-(2,4,6-trimethylbenzoyl)-phenyl-phosphinate (TPO-L), bis-(2,4,6-trimethyl) benzoyl)-phenyl-phosphine oxide (Irgacure 819) and the like. These may be used alone or in combination with each other.

However, the optical clear resin is not necessarily limited to the above description. In an embodiment, the optical clear resin may further include a polypropylene glycol (PPG)-based oligomer. In addition, the glass transition temperature and the molecular weight of the tetrahydrofuran (THF)-based oligomer may be variously set as needed.

Figure 4:
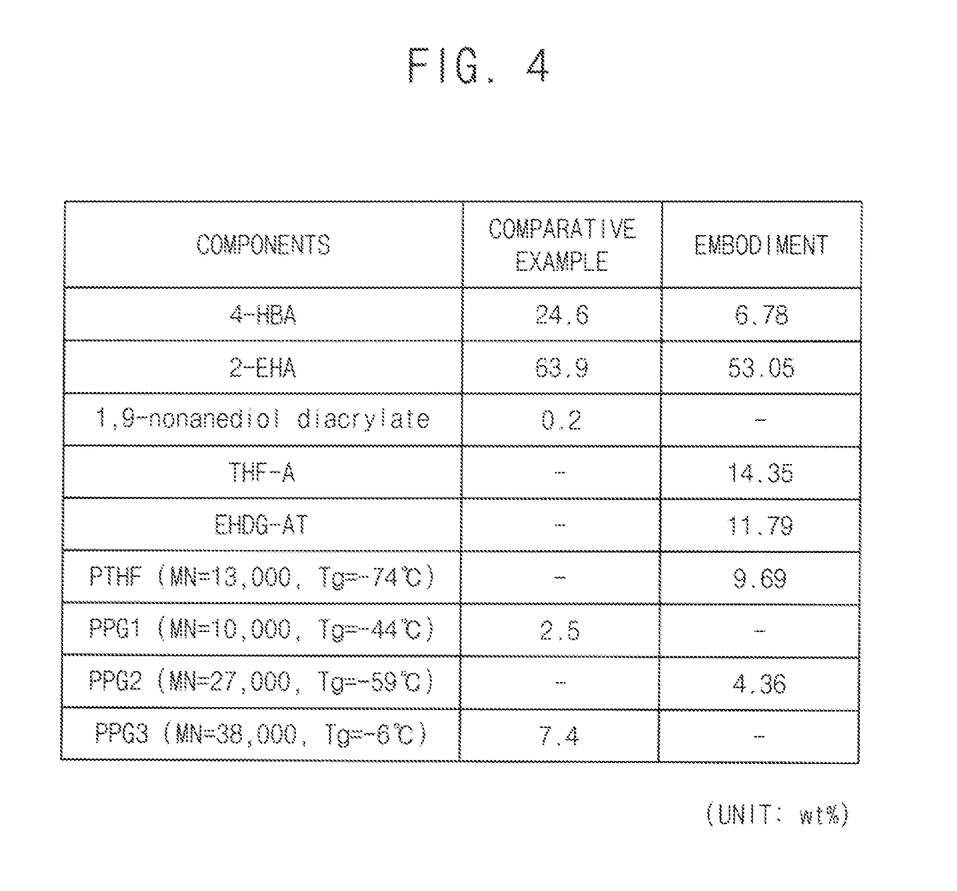
FIG. 4 is a table illustrating components of a comparative example and components of an embodiment of the present invention.
Figure 5:
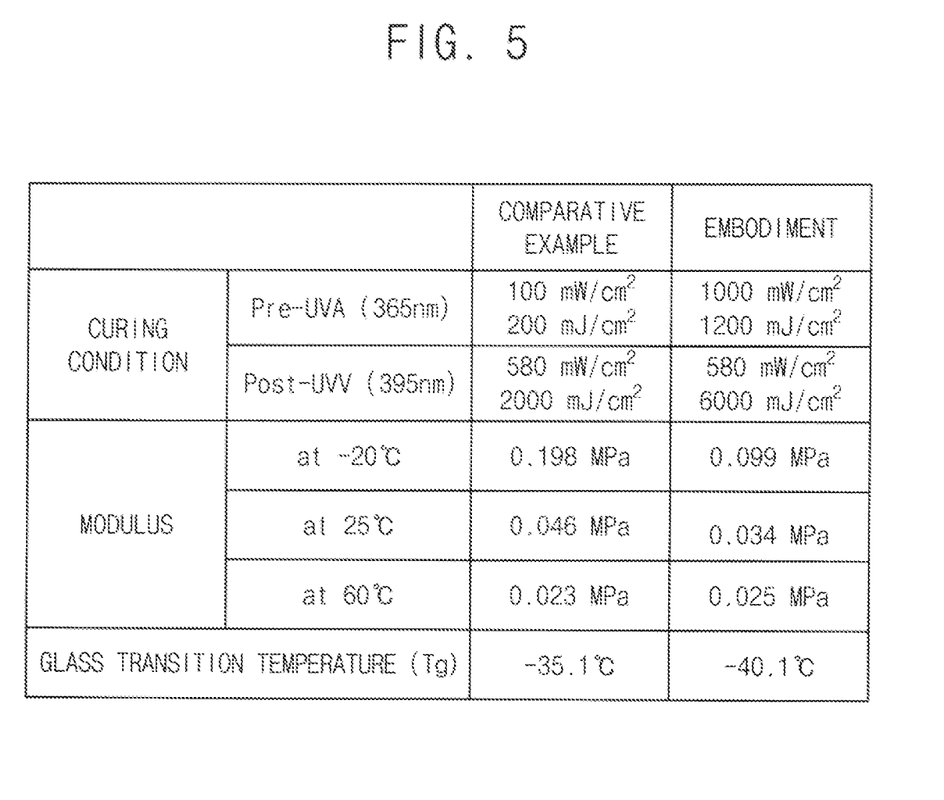
FIG. 5 is a table illustrating an experimental result of a comparative example and an experimental result of an embodiment of the present invention.

FIG. 4 is a table illustrating components of a comparative example and components of an embodiment of the present invention. FIG. 5 is a table illustrating an experimental result of a comparative example and an experimental result of an embodiment of the present invention.

Referring to FIG. 4, a comparative example is an optical clear resin that does not include a polytetrahydrofuran (PTHF)-based oligomer, and the embodiment of the present invention is an optical clear resin that includes a polytetrahydrofuran (PTHF)-based oligomer.

In detail, the comparative example is the optical clear resin including about 24.6 wt % of 4-HBA, about 63.9 wt % of 2-EHA, about 0.2 wt % of 1,9-nonandiol diacrylate, about 2.5 wt % of PPG1, and about 7.4 wt % of PPG3.

The optical clear resin according, to an embodiment of the present invention, may include about 5 wt % to about 20 wt % of PTHF. In addition, the optical clear resin according to an embodiment of the present invention may contain about 70 wt % to about 90 wt % of an acrylate-based monomer, the weight ratio of the 4-hydroxybutylacrylate (4-HBA) may be about 5 wt % to about 15 wt %, the weight ratio of 2-ethylhexyl acrylate (2-EHA) may be about 50 wt % to about 65 wt %, the weight ratio of tetrahydrofurfuryl acrylate (THF-A) may be about 10 wt % to about 20 wt %, and the weight ratio of the 2-ethylhexyl diethylene glycol acrylate (EHDG-AT) may be about 5 wt % to about 15 wt %.

The embodiment used in the experiments is the optical clear resin including about 6.78 wt % of 4-HBA, about 53.05 wt % of 2-EHA, about 14.35 wt % THF-A, about 11.79 wt % of EHDG-AT, about 9.69 wt % PTHF, and about 4.36 wt % of PPG2.

The PPG1, the PPG2, and the PPG3 refer to polypropylene glycol-based oligomers. The molecular weight of the PPG1 is about 10,000, and the glass transition temperature of the PPG1 is about −44° C. The molecular weight of the PPG2 is about 27,000, and the glass transition temperature of the PPG2 is about −59° C. The molecular weight of the PPG3 is about 38,000, and the glass transition temperature of the PPG3 is about −6° C.

Referring to FIG. 5, a thickness of the third adhesive layer AD3 was set to about 50 μm, and experiments were performed on the comparative examples and the embodiment of the present invention.

1) In the pre-cure process, UV having a wavelength of 365 nm was used to expose the adhesive in the comparative example and the embodiment, respectively. In order to perform the pre-cure process, UV with an output of about 100 mW/cm² and an intensity/dose of 200 mJ/cm² was used to expose the optical clear resin according to the comparative example. In order to perform the pre-cure process, UV with an output of about 1000 mW/cm² and an intensity/dose of light of about 1200 mJ/cm² was used to expose the optical clear resin according to the embodiment. For example, the optical clear resin, according to the embodiment, could be irradiated with UV light having a relatively high output and intensity/dose. Accordingly, the curing speed of the optical clear resin, according to the embodiment, may be increased, and the curing time may be shortened. Accordingly, the shape of the optical clear resin during the curing process can be more easily maintained, and the manufacturing time can be shortened.

2) In the post-cure process, UV having a wavelength of 395 nm was used to expose the adhesive with the comparative example and the embodiment, respectively. In order to perform the post-cure process, UV with an output of about 580 mW/cm2 and an intensity/dose of about 2000 mJ/cm² was used to expose the optical clear resin according to the comparative example. In order to perform the post-cure process, UV with an output of about 580 mW/cm2 and an intensity/dose of about 6000 mJ/cm² was used to expose the optical clear resin according to the embodiment. For example, the optical clear resin, according to the embodiment, could be irradiated with UV having a relatively high quantity of light. Accordingly, the curing speed of the optical clear resin, according to the embodiment, may be increased, and the curing time may be shortened. Accordingly, the shape of the optical clear resin, according to the embodiment, may be easily maintained, and the manufacturing time may be shortened.

3) As a result of measuring the modulus of elasticity of the optical clear resin, the modulus of elasticity of the optical clear resin, according to the comparative example, was measured to be about 0.198 MPa at about −20° C. The modulus of elasticity of the optical clear resin, according to the embodiment, was measured to be about 0.099 MPa at about −20° C. The optical clear resin, according to the embodiment, may maintain a relatively low modulus of elasticity at a low temperature. For example, the optical clear resin, according to the embodiment, may maintain a modulus of elasticity lower than about 0.13 MPa at about −20° C. Accordingly, the display device 1000 may be folded. In addition, the modulus of elasticity of the optical clear resin, according to the comparative example, was measured to be about 0.046 MPa at about 25° C. and about 0.023 MPa at about 60° C. The modulus of elasticity of the optical clear resin, according to the embodiment, was measured to be about 0.034 MPa at about 25° C. and about 0.025 MPa at about 60° C.

4) As a result of measuring the glass transition temperature of the optical clear resin, the glass transition temperature of the optical clear resin, according to the comparative example, was measured to be about −35.1° C. The glass transition temperature of the optical clear resin, according to the embodiment, was measured to be about −40.1° C. As the glass transition temperature of the optical clear resin, according to the embodiment, is lowered, the above-described modulus of elasticity of the optical clear resin may be lowered. For example, the glass transition temperature of the optical clear resin, according to the embodiment, may be about −35° C. or less.

Referring back to FIG. 3, the window 600 may be disposed on the third adhesive layer AD3. The window 600 may be adhered to the polarizing layer 500 through the third adhesive layer AD3. The window 600 may protect the display panel 400. For example, the window 600 may include transparent polyimide, ultra-thin tempered glass ("UTG"), polyethylene terephthalate ("PET"), polyimide ("PI"), polyethersulfone ("PS"), polyacrylate ("PAR"), polyetherimide ("PEI"), polyethylene naphthalate ("PEN"), polyphenylene sulfide ("PPS"), polycarbonate ("PC"), and the like. These may be used alone or in combination with each other.

The protective layer 700 may be disposed on the window 600. The protective layer 700 may protect the window 600. In an embodiment, the protective layer 700 may be formed of plastic. Examples of plastics that can be used as the protective layer 700 may include transparent polyimide, polyethylene terephthalate, polyimide, polyethersulfone, polyacrylate, polyetherimide, polyethylene naphthalate, polyphenylene sulfide, polycarbonate and the like. These may be used alone or in combination with each other.

Figure 6:
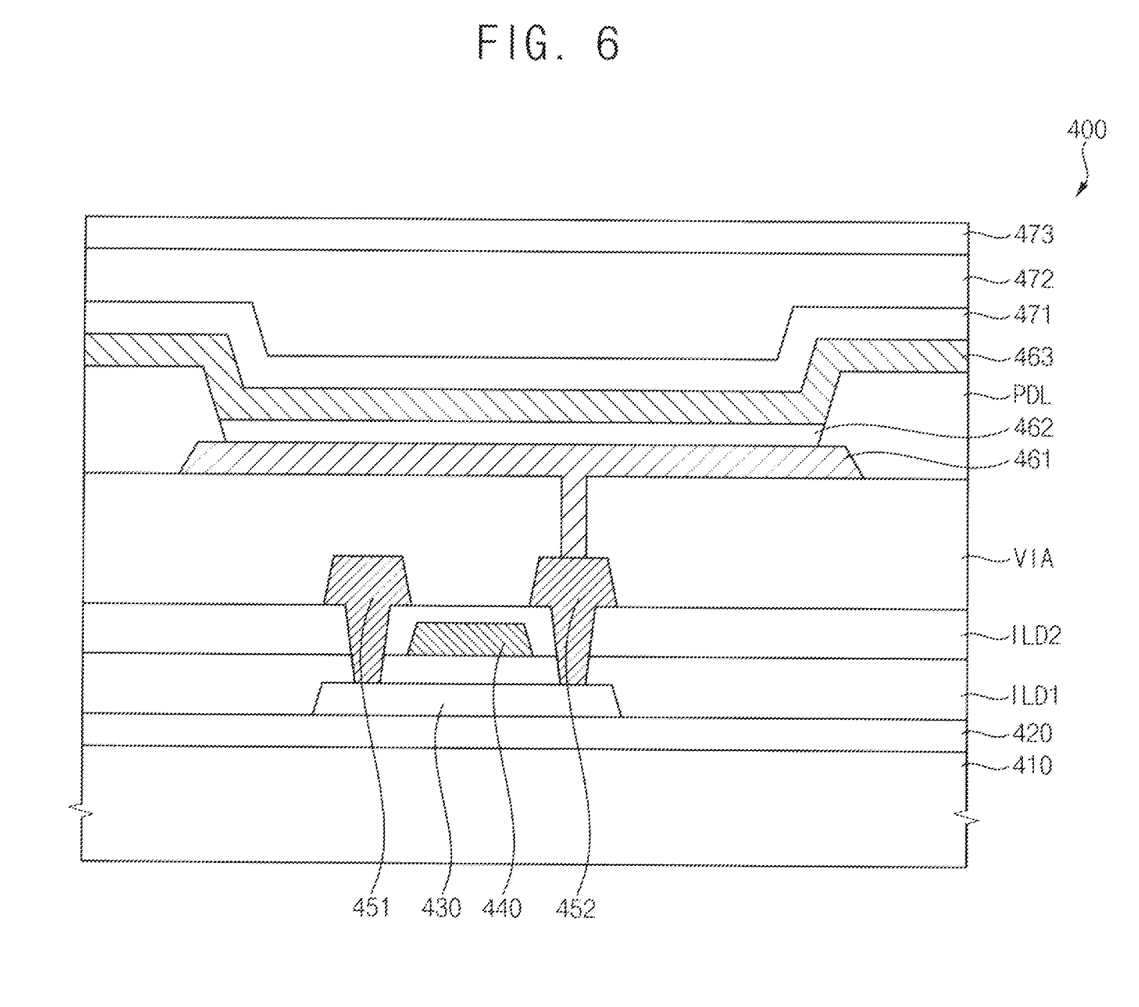
FIG. 6 is a cross-sectional view illustrating a display module included in the display device of FIG. 3.

FIG. 6 is a cross-sectional view illustrating a display module included in the display device of FIG. 3.

Referring to FIG. 6, the display panel 400 may include a substrate 410, a buffer layer 420, an active pattern 430, a first insulating layer ILD1, a gate electrode 440, a second insulating layer ILD2, a source electrode 451, a drain electrode 452, a via insulating layer VIA, a first electrode 461, an emission layer 462, a second electrode 463, a pixel defining layer PDL, a first inorganic layer 471, an organic layer 472, and a second inorganic layer 473.

The substrate 410 may include glass, quartz, plastic, or the like. For example, the substrate 410 may be a plastic substrate and may include polyimide ("PI"). In an embodiment, the substrate 410 may have a structure in which at least one polyimide layer and at least one barrier layer are alternately stacked.

The buffer layer 420 may be disposed on the substrate 410. The buffer layer 420 may include silicon oxide, silicon nitride, or the like. The buffer layer 420 may prevent impurities from diffusing into the active pattern 430.

The active pattern 430 may be disposed on the buffer layer 420. For example, the active pattern 430 may include a silicon semiconductor, an oxide semiconductor, or the like. The silicon semiconductor may include amorphous silicon, polycrystalline silicon, or the like. The active pattern 430 may pass a current or block a current according to a gate signal provided to the gate electrode 440.

The first insulating layer ILD1 may include an insulating material and may cover the active pattern 430. For example, the first insulating layer ILD1 may include silicon oxide, silicon nitride, titanium oxide, tantalum oxide, or the like. The first insulating layer ILD1 may electrically insulate the active pattern 430 and the gate electrode 440.

The gate electrode 440 may include a metal, an alloy, a conductive metal oxide, or the like, and may be disposed on the first insulating layer ILD1. For example, the gate electrode 440 may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), and the like.

The second insulating layer ILD2 may include an insulating material and may cover the gate electrode 440. For example, the second insulating layer ILD2 may include silicon oxide, silicon nitride, titanium oxide, tantalum oxide, or the like. The second insulating layer ILD2 may electrically insulate the gate electrode 440 from the source electrode 451 and electrically insulate the gate electrode 440 from the drain electrode 452.

The source electrode 451 and the drain electrode 452 may include a metal, an alloy, or a conductive metal oxide, and may be disposed on the second insulating layer ILD2. For example, the source and drain electrodes 451 and 452 may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), and the like.

The via insulating layer VIA may cover the source and drain electrodes 451 and 452, may include an organic insulating material, and may have a substantially flat/planar top surface. For example, the via insulating layer VIA may include a photoresist, a polyacrylic resin, a polyimide resin, an acrylic resin, or the like.

The first electrode 461 may be disposed on the via insulating layer VIA. The first electrode 461 may include a metal, an alloy, a conductive metal oxide, or the like. For example, the first electrode 461 may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), and the like. The first electrode 461 may receive a first voltage from the drain electrode 452.

The pixel defining layer PDL may be disposed on the via insulating layer VIA, and an opening exposing a top surface of the first electrode 461 may be formed in the pixel defining layer PDL. For example, the pixel defining layer PDL may be formed of an organic material such as polyimide-based resin (e.g., photosensitive polyimide-based resin ("PSPI")), photoresist, polyacrylic resin, acrylic resin, or an inorganic material such as silicon oxide and silicon nitride.

The emission layer 462 may be disposed on the first electrode 461. The emission layer 462 may have a multilayer structure including an organic emission layer, a hole injection layer, a hole transport layer, an electron transport layer, and an electron injection layer.

The second electrode 463 may be disposed on the emission layer 462 and may receive a second voltage. The second electrode 463 may include a metal, an alloy, a conductive metal oxide, or the like. For example, the second electrode 463 may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), and the like.

The emission layer 462 may generate light according to a voltage difference between the first voltage and the second voltage. Accordingly, the first electrode 461, the emission layer 462, and the second electrode 463 may be defined as organic light emitting diode.

A thin film encapsulation layer may be disposed on the second electrode 463. The thin film encapsulation layer may prevent penetration of moisture and oxygen from the outside. For example, the thin film encapsulation layer may have a structure in which the first inorganic layer 471, the organic layer 472, and the second inorganic layer 473 are alternately stacked.

The display device 1000, according to an embodiment of the present invention, may include the third adhesive layer AD3. The third adhesive layer AD3 may include an optical clear resin, and the optical clear resin may include a tetrahydrofuran (THF)-based oligomer.

As the optical clear resin includes a tetrahydrofuran (THF)-based oligomer, UV light having a relatively high output and a high intensity/dose may be used to expose the optical clear resin. Accordingly, the curing time of the optical clear resin may be shortened. Accordingly, the shape of the optical clear resin may be easily maintained during the curing process, and the manufacturing time of the display device 1000 may be shortened.

In addition, as the optical clear resin includes a tetrahydrofuran (THF)-based oligomer, the glass transition temperature of the optical clear resin may be lowered. Accordingly, the modulus of elasticity of the optical clear resin may be lowered. In addition, the modulus of elasticity at a low temperature of the optical clear resin may be maintained low. Accordingly, the recovery rate of the third adhesive layer AD3 may be increased, and the foldability of the display device 1000 may be increased.

Although certain embodiments and implementations have been described herein, other embodiments and modifications will be apparent from this description. Accordingly, the inventive concepts are not necessarily limited to such embodiments, but various modifications and equivalent arrangements as would be apparent to a person of ordinary skill in the art are included within the scope of the present disclosure.

What is claimed is:

1. An optical clear resin, comprising:
    a tetrahydrofuran(THF)-based oligomer having a glass transition temperature of about −50° C. or less;
    an acrylate-based monomer; and
    a photoinitiator.

2. The optical clear resin of claim 1, wherein the glass transition temperature of the tetrahydrofuran-based oligomer is about −70° C. or less.

3. The optical clear resin of claim 1, wherein a molecular weight of the tetrahydrofuran-based oligomer is about 20,000 or less.

4. The optical clear resin of claim 3, wherein the molecular weight of the tetrahydrofuran-based oligomer is about 13,000 or less.

5. The optical clear resin of claim 1, wherein a weight ratio of the tetrahydrofuran-based oligomer, with respect to the optical clear resin, is about 5 wt % to about 20 wt %.

6. The optical clear resin of claim 1, wherein the acrylate-based monomer comprises 4-hydroxybutyl acrylate (4-HBA), 2-ethylhexyl acrylate (2-EHA), tetrahydrofurfuryl acrylate (THF-A), and/or 2-ethylhexyl diethylene glycol acrylate (EHDG-AT).

7. The optical clear resin of claim 6, wherein a weight ratio of the acrylate-based monomer, with respect to the optical clear resin, is about 70 wt % to about 90 wt %.

8. The optical clear resin of claim 7,
    wherein when the acrylate-based monomer comprises 4-HBA, a weight ratio of the 4-hydroxybutyl acrylate (4-HBA), with respect to the optical clear resin, is about 5 wt % to about 15 wt %,
    wherein when the acrylate-based monomer comprises 2-EHA, a weight ratio of the 2-ethylhexyl acrylate (2-EHA), with respect to the optical clear resin, is about 50 wt % to about 65 wt %,
    wherein when the acrylate-based monomer comprises THF-A, a weight ratio of the tetrahydrofurfuryl acrylate (THF-A), with respect to the optical clear resin, is about 10 wt % to about 20 wt %, and
    wherein when the acrylate-based monomer comprises EHDG-AT, a weight ratio of the 2-ethylhexyl diethylene glycol acrylate (EHDG-AT), with respect to the optical clear resin, is about 5 wt % to about 15 wt %.

9. The optical clear resin of claim 1, wherein the photoinitiator comprises ethyl-(2,4,6-triethylbenzoyl)-phenyl-phosphinate (TPO-L) and/or bis-(2,4,6-trimethylbenzoyl)-phenyl-phosphine oxide.

10. The optical clear resin of claim 1, further comprising:
    a polypropylene glycol (PPG)-based oligomer.

11. A display device, comprising:
    a display panel including a folding area;
    a window disposed over the display panel; and
    an adhesive layer disposed between the display panel and the window, the adhesive layer including an optical clear resin,
    wherein the optical clear resin comprises:
        tetrahydrofuran(THF)-based oligomer having a glass transition temperature of about −50° C. or less;
        an acrylate-based monomer; and
        a photoinitiator.

12. The display device of claim 11, wherein a modulus of elasticity of the adhesive layer is about 0.13 MPa or less at −20° C.

13. The display device of claim 11, wherein a glass transition temperature of the adhesive layer is about −35° C. or less.

14. The display device of claim 11, wherein a glass transition temperature of the tetrahydrofurazan-based oligomer is about −70° C. or less.

15. The display device of claim 11, wherein a molecular weight of the tetrahydrofuran-based oligomer is about 20,000 or less.

16. The display device of claim 15, wherein the molecular weight of the tetrahydrofuran-based oligomer is about 13,000 or less.

17. The display device of claim 11, wherein a weight ratio of the tetrahydrofuran-based oligomer, with respect to the optical clear resin, is about 5 wt % to about 20 wt %.

18. The display device of claim 11, further comprising:
    a polarizing layer disposed over the display panel, between the display panel and the window,
    wherein the adhesive layer adheres the polarizing layer to the window.

19. The display device of claim 11, further comprising:
    a protective film disposed under the display panel;
    a buffer member disposed under the protective film; and
    a support member disposed under the buffer member.

20. The display device of claim 11, wherein the display panel is foldable within the folding area and the adhesive layer and the window are each foldable in a region corresponding with the folding area of the display panel.

\* \* \* \* \*